Sept. 12, 1933.  E. F. TAFEL  1,926,659
RECIPROCATING CONVEYER
Filed Nov. 22, 1927  3 Sheets-Sheet 1
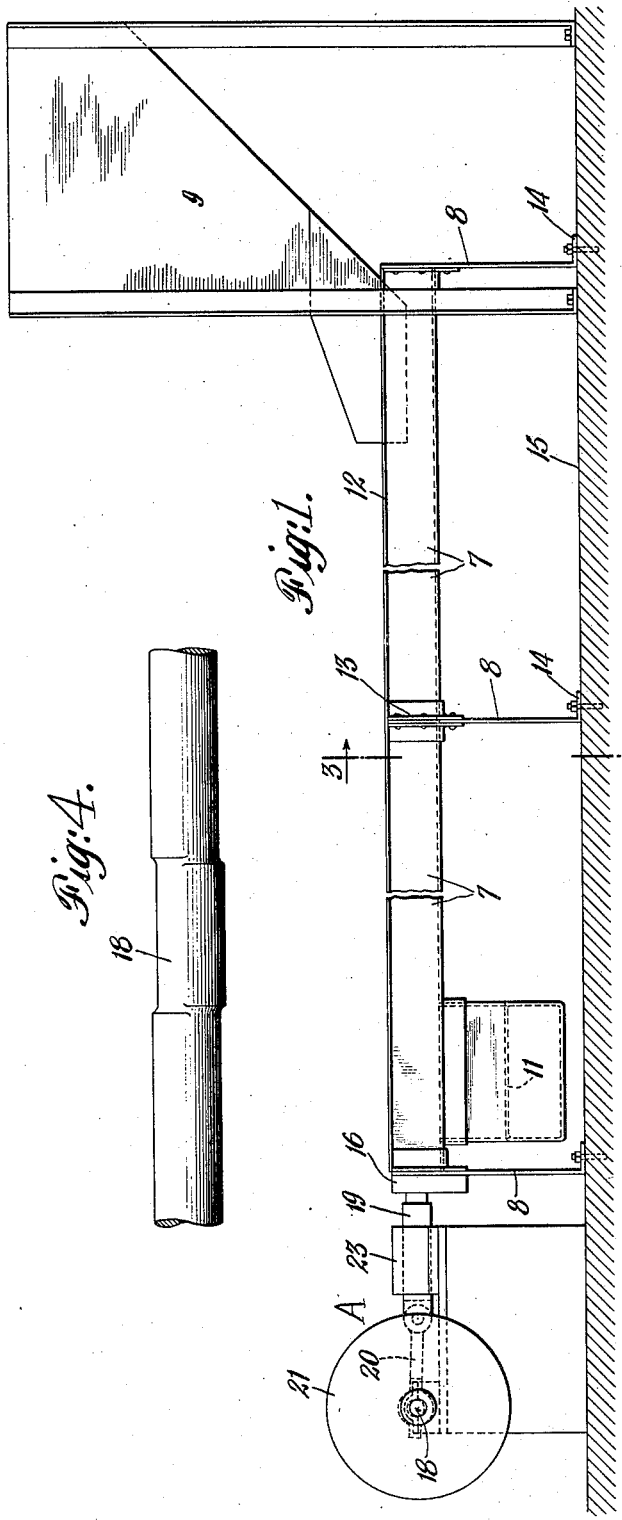
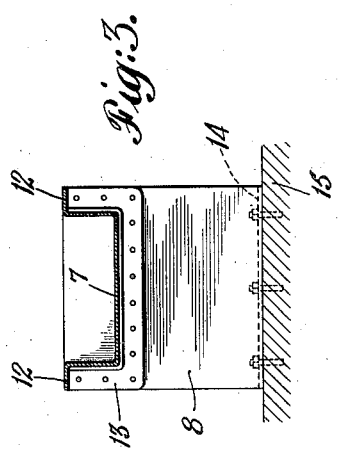
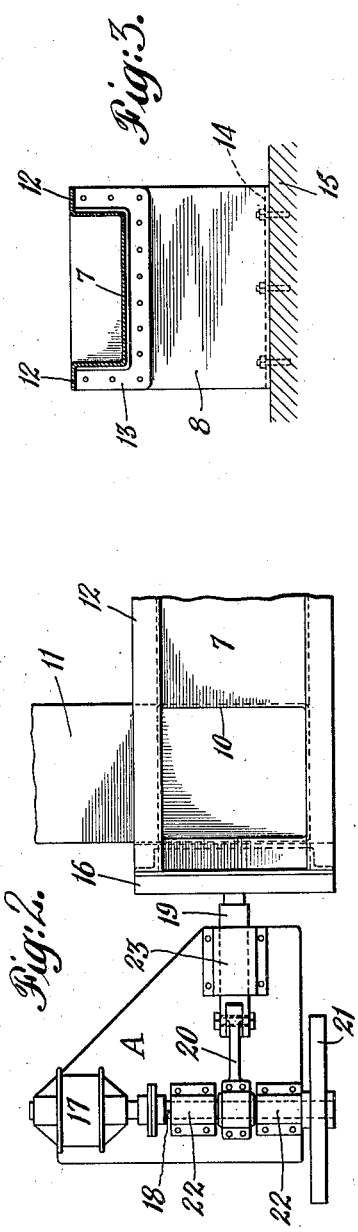
INVENTOR
Edward F. Tafel
BY
ATTORNEYS Sept. 12, 1933.     E. F. TAFEL     1,926,659
RECIPROCATING CONVEYER
Filed Nov. 22, 1927     3 Sheets-Sheet 2
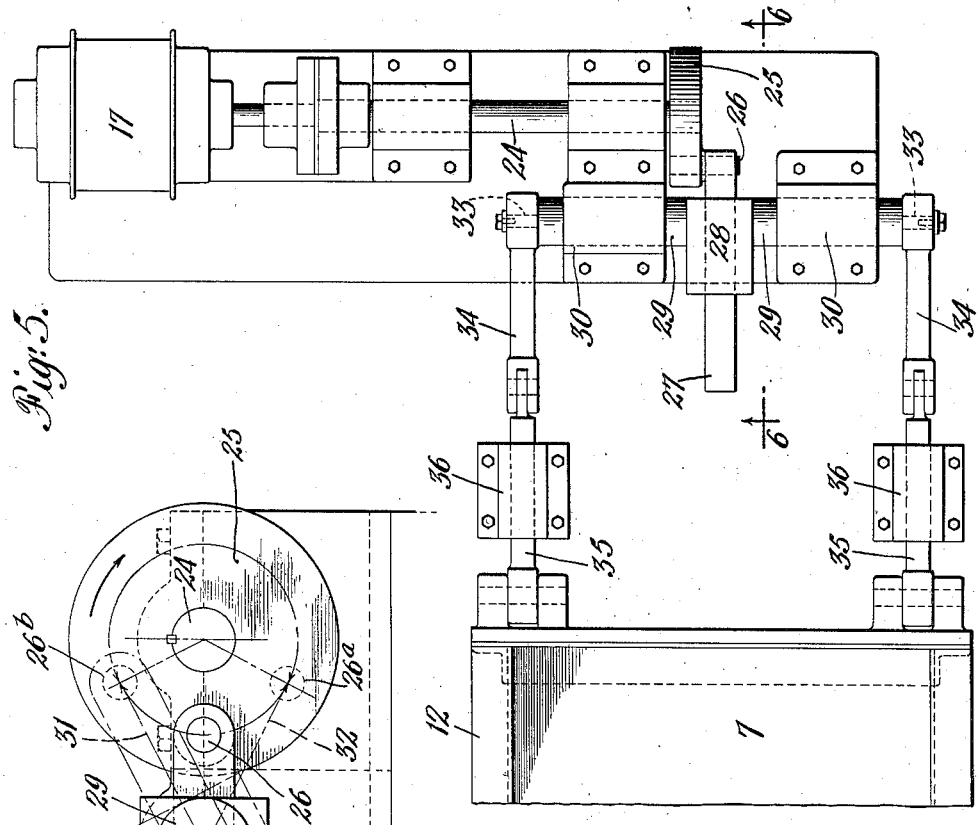
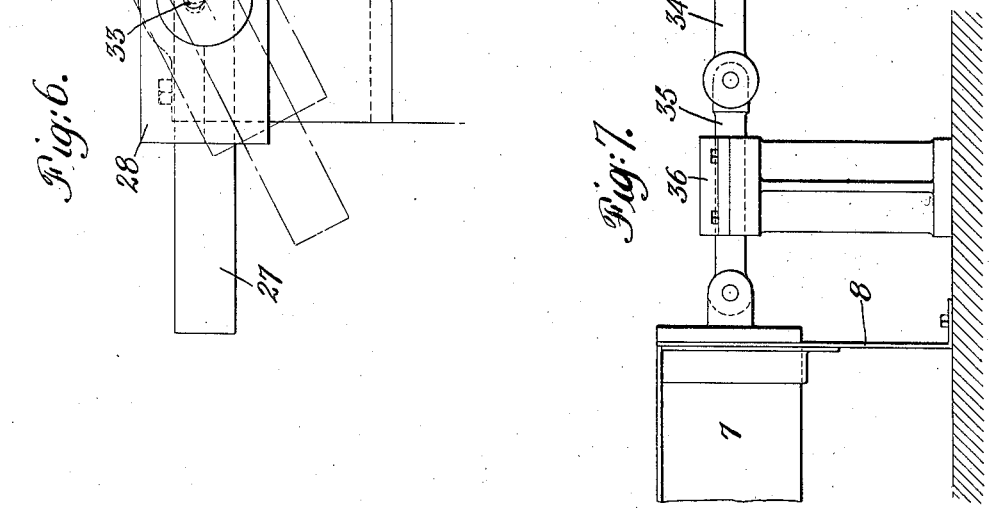
INVENTOR
Edward F. Tafel
BY
Synnestvedt & Lechner
ATTORNEYS Sept. 12, 1933.　　　　E. F. TAFEL　　　　1,926,659
RECIPROCATING CONVEYER
Filed Nov. 22, 1927　　　3 Sheets-Sheet 3
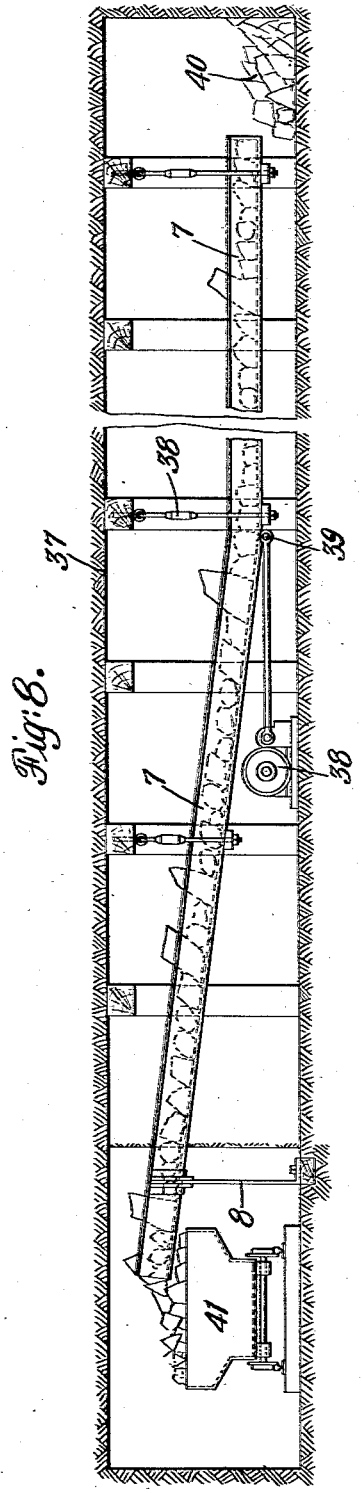
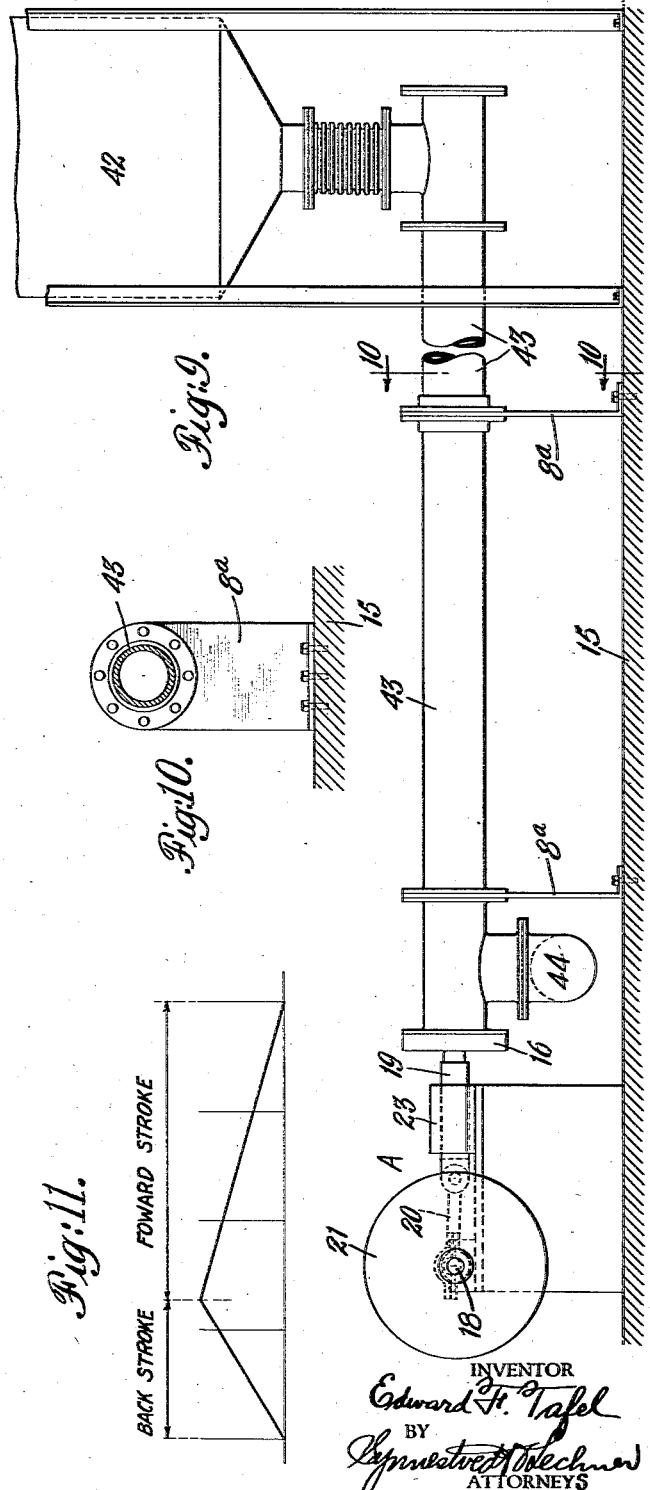
INVENTOR
Edward F. Tafel
BY
Sylvester Brechner
ATTORNEYS

UNITED STATES PATENT OFFICE 1,926,659

RECIPROCATING CONVEYER

Edward F. Tafel, Painesville, Ohio

Application November 22, 1927
Serial No. 235,039

4 Claims. (Cl. 198—220)

This invention relates to reciprocating conveyers and can be applied for use in the transportation of almost any type of solid material, such, for example, as coal, pulverized fuel, grain, cement, etc.

The principal object of my invention is to provide a conveyer of the character specified which utilizes a comparatively short stroke high speed vibration of the conveyer element as opposed to what might be termed a long stroke slow speed oscillation. Insofar as I am aware, no reciprocating conveyer heretofore has been run at a speed greater than approximately one hundred strokes per minute, whereas, with my improved conveyer, I propose to make use of a very short stroke which is repeated a much greater number of times, say, for example, somewhere in the neighborhood of from about 600 to 3600 strokes per minute. With such high speeds I am enabled to take advantage of a very short stroke, indeed, say anywhere from in the neighborhood of $\frac{1}{32}$ of an inch upward to around $\frac{1}{4}$ inch or thereabout, and I prefer to keep below a $\frac{1}{4}$ inch stroke. With the previously known devices the stroke has been anywhere from an inch up to six inches or more, with the average being probably somewhere around five inches. With such long strokes it has not been possible to take advantage of what I have termed high speed vibration with the uniformity of flow incident thereto as opposed to the comparatively slow speed oscillation heretofore in use.

With the foregoing in mind, therefore, it is a further object of my invention to provide a reciprocating conveyer which will cause a very steady uniform flow of the material to be transported. This is of great advantage where sorting is to take place during the period of transportation, and, furthermore, the short stroke with its steady uniform flow which I employ is especially advantageous in the transportation of friable or dusty materials because it has a less tendency to break them down into smaller pieces or create annoying dust clouds during operation of the conveyer.

It is a further object of my invention to provide a reciprocating conveyer with which the simplest type of support is possible, such, for example, as that which would be supplied by a series of upstanding elastic bodies fixed at the bottom to a stationary base or a plurality of suspension devices, such as rods, chains, or ropes, arranged in a series from one end to the other of the conveyer. In addition and in connection with the foregoing object, it is also an object of my invention to reduce the arc of travel at the point or points of support to such a degree that there will be substantially no departure from the plane in which the conveyer extends.

Another important object of my invention is to provide a reciprocating conveyer in which the connection between the motor device and the conveyer may be a direct one, that is, one in which the motor is connected to the conveyer without the interposition of any speed reduction devices which are cumbersome, costly and difficult to maintain in service.

A still further object of the invention is to provide a reciprocating conveyer with which it is readily possible to use a pipe instead of an open trough for the transportation of dusty materials, such as cement or pulverized fuel.

I also aim to provide a conveyer which is extremely simple and inexpensive to manufacture or install and easy to maintain, and one in which there are a minimum number of points where wear can occur.

Another object of the invention is the provision of a reciprocating conveyer in which the direction of travel of the material being transported can be changed at will, simply by reversing the direction in which the motor for driving it is operating.

The foregoing, together with such other objects as may hereinafter appear, or are incident to my invention, I obtain by means of a construction which is illustrated in the preferred form in the accompanying drawings, wherein—

Fig. 1 is a side elevation of a reciprocating conveyer mechanism embodying certain features of my invention.

Fig. 2 is a plan view of the left-hand end of the device in Fig. 1 showing one type of driving mechanism for my conveyer.

Fig. 3 is a section on the line 3—3 of Fig. 1.

Fig. 4 is an enlarged view of the operating crank for driving the conveyer of Figs. 1 and 2.

Fig. 5 is a plan view of the type of driving mechanism which I prefer.

Fig. 6 is a section on the line 6—6 of Fig. 5.

Fig. 7 is a side elevation illustrating certain details of the connection between the driving mechanism and the conveyer proper.

Fig. 8 is a side elevation of a reciprocating conveyer embodying my invention showing it in service in a mine and illustrating how it will convey material upgrade.

Fig. 9 is a side elevation of my invention as applied to a closed conveyer element such as a pipe.

Fig. 10 is a section on the line 10—10 of Fig. 9, and

Fig. 11 shows a typical acceleration curve for a conveyer having the driving mechanism of Figs. 5 to 7.

The conveyer of Figs. 1 to 4 inclusive comprises essentially the trough 7, the spring supports 8 and the driving mechanism indicated as a whole by the reference character A.

The material to be conveyed is fed into the trough from a bin or hopper 9 and upon arrival at the opposite end of the conveyer such material falls down through an opening 10 in the bottom of the conveyer element into a laterally extending discharge chute 11.

The conveying element or trough 7 is laterally flanged as at 12 and may be composed of a plurality of sections joined together by flanged securing means as at 13.

The supporting springs 8 are, preferably, simple flat pieces of spring metal of a width substantially equal to the overall width of the conveyer element or trough 7 and provided at the bottom with horizontal flanges 14 by means of which they can be securely bolted to the base structure 15.

I have shown a support 8 at either end of the conveyer and I prefer to place one between adjacent sections 7 of the conveyer element as shown at the joint 13.

At the end where the driving takes place I prefer to provide the conveyer element 7 with a shock absorbing pad 16.

The driving apparatus comprises the electric motor 17 adapted to rotate the crank shaft 18, the impact piston 19 and the connecting rod 20. The crank shaft 18 may be provided with a flywheel 21 if desired and at each side of the connecting rod 20 I arrange large sized bearings 22. The driving piston 19 reciprocates in the block 23.

The operation of Figs. 1 to 4 inclusive is as follows, attention being directed to the fact that the driving connection between the motor 17 and the conveyer 7 is a direct connection without the interposition of any speed reduction devices such as gears. The throw of the crank shaft 18 is preferably very small, but can be varied, of course, within certain limits, although I have found by experience that best results can be secured where the total stroke is in the neighborhood of about $\frac{1}{32}$ to $\frac{1}{8}$ of an inch, although both shorter and longer strokes might be employed.

The average commercially available electric motor is a fairly high-speed proposition, say in the neighborhood of twelve hundred revolutions per minute with many of them running a great deal higher. Slower speed motors are, of course, available, but generally only upon special order and at a large increase in cost.

The speed of the motor must not be too great in comparison to the period of vibration of the spring supports 8. In fact, in practice, best results are secured if the speed of the motor be such as will cause the piston 19 to reciprocate slightly slower than the springs 8 will vibrate. If the piston travels too fast a phase displacement results which causes a "bumpy" conveying action liable to continue for a substantial interval.

The time of the stroke in each direction may not always be equal, although probably that would be the ideal condition for the type of drive used in the arrangement of Figures 1 to 4. Under practical conditions, however, any variation in the load the conveyer may be carrying will produce a corresponding difference in the degree of "dampening" of the vibration of the springs. Therefore, it is best to proportion the speed of the motor to the slowest possible vibration of the springs 8.

The action or operation of the device of Figs. 1 to 4 is probably as follows:

With the conveyer trough at rest and the crank 18 at or just past the back dead center the rubber tipped plunger 19 is arranged so that it will just touch the rubber bumping pad 16, or, at least, almost touch it, if it does not actually do so. The motor is started, and as the piston moves, its rubber tip will press against the block 16 and force the conveyer to the right, and on this first stroke the material in the conveyer will move to the right with it.

The motion of the piston is, of course, harmonic—that is, it is slow at either end, with the maximum rate of travel at the center.

When the conveyer has reached the end of the stroke positively imparted to it by the piston, it will continue to move to the right for a very brief interval, since its momentum will prevent its coming to rest instantly. The piston starts back to the left immediately after completing its right hand stroke, so that at this instant the conveyer and the piston are actually moving in opposite directions.

In moving the conveyer to the right the spring supports 8 were deflected in that direction, and after the piston has started on its left hand stroke, the conveyer first comes to rest and then starts to swing back to the left, with a velocity which at first is zero, but which gradually increases to its maximum at the time that the spring supports are again in the right or vertical position.

The tendency of the spring is to carry the conveyer as far to the left as it was deflected to the right, but when the conveyer comes to the position where the spring supports are upright, the pad 16 comes into contact with the rubber tipped piston 19. Such contact may take place just as the piston comes to rest, slightly before it comes to rest or slightly after, the exact point varying from time to time.

When the pad strikes the piston, there results a collision which follows the well known laws governing the collision of elastic bodies. That is, there is at first a compression of the rubber, then an expansion which results in the conveyer bouncing back to the right with a velocity very nearly, if not actually, equal to that which it had at the time of impact.

It will, therefore, be seen that on the stroke to the right the conveyer attains its maximum velocity at the instant of collision, or at an almost inappreciable moment thereafter. Thus, the motion of the conveyer to the right is maximum almost at the instant that the right hand stroke is begun. The maximum velocity of the piston also is attained at approximately this same point, or possibly an instant later, and the piston pushes the conveyer to the right. As the stroke continues the velocity decreases until it comes to rest as before described.

The average speed of the two motions may be substantially equal, but the motion toward the right runs from a maximum at the start to zero at the end, while the motion to the left runs from zero at the start to maximum at the end. After the initial stroke, when the conveyer is first started, the velocity toward the right is so great at the beginning of the stroke that the inertia of the material moving to the left with the conveyer overcomes the friction between the material and the trough, so that the material will continue in motion to the left, while the trough slides from under to the right. On the left hand stroke the motion is sufficiently slow at first so that the material can accelerate along with the trough. The left stroke is termed the forward stroke because the material is carried forward on the left stroke and the right stroke is called the back stroke.

The material moves forward in a steady stream with hardly any visible vibration either in the material itself or in the conveyer trough or element 7. The action is extremely uniform and steady and the velocity reasonably fast, the speed being such as to lend itself very admirably to conveying mechanisms from which sorting operations are to be performed while the material is in transit.

It will thus be seen that I have made possible the employment of a comparatively short stroke high-speed vibration of the conveyer element as opposed to what might be termed a long stroke slow-speed oscillation. This type of stroke enables me to use such simple supporting means as the elements 8, the arc of travel at the upper ends of such supports being of extremely small dimension, so small indeed as to cause no substantial departure from the true horizontal or true plane of the conveyer element 7. This is a very important feature of the invention as it entirely eliminates any tossing action of the material which has been an incident to a great many reciprocating conveyers heretofore known to the art. Where the stroke is materially longer than what I have proposed it is necessary to provide certain complicated leverage mechanisms at the point where the conveyer element is supported in order to offset the deflection caused by the arc through which the supporting elements travel during operation of the mechanism.

A reciprocating conveyer of the type which I have disclosed is very simple to manufacture, install and operate and it is obvious that it can be utilized in a very great many locations where complicated conveyers would not be feasible.

In Figs. 5 to 7 inclusive I have illustrated a different type of connection between the driving motor 17 and the conveying trough 7. This type of connection is utilized where it is preferred to employ a positive application of power to the conveyer in both directions of its travel. The shaft 24 operated by the motor 17 is provided with a crank disc 25 at its outer end upon which is mounted a crank pin 26. Attached to the pin 26 is a rod 27 slidably mounted in a block 28. The block is provided with the hubs 29 mounted in the bearings 30.

It will, therefore, be seen that as the crank pin 26 rotates it will move the rod 27 backward and forward to tip the block 28 first in the dotted line position 31 (see Fig. 6) and then in a corresponding inclined position above the full line position shown in Fig. 6 and indicated by the line 32 in Fig. 6. Each end of the hub 29 is provided with an eccentrically mounted pin 33 and these pins 33 are connected to the conveyer 7, preferably one at each corner as shown in Fig. 5, by means of the crank arms 34 and connecting rods 35, the latter being mounted for reciprocation in the blocks 36.

The operation of the device is as follows. Assume that the motor 17 is traveling in a clockwise direction as indicated by the arrow in Fig. 6. The crank pin 26 in traveling from the position 26a to the position 26b will move the block 28 from its upper position to its lower position and in traveling from the position 26b to the position 26a it will return the block 28 from the lower position to the upper position. However, since the speed of rotation of the motor is constant the block 28 will be moved much more quickly when the pin 26 is traveling from the point 26a to the point 26b than it will move when the pin 26 is passing from the point 26b to the point 26a since the arc of travel from point 26a to 26b is much less than the arc of travel from 26b to 26a.

The pin 33, therefore, will swing backwardly and forwardly as shown by the dotted lines in Fig. 6, but with a very much faster stroke in one direction than in the other. The conveyer 7, therefore, will be actuated with a very quick stroke in one direction and a comparatively slow stroke in the other direction, and the conveying action imparted to the material will be substantially the same as that which is imparted by the mechanism of Figs. 1 to 4 inclusive. With a device of this type, it would not be necessary, of course, to use resilient or spring supports 8 for the conveyer 7, although no harm is done by so doing.

The driving mechanism of Figs. 5 to 7 inclusive makes possible a reversal of the direction of travel of the material simply by reversing the direction of the motor, a feature which is of much importance in many installations, particularly mine work.

In Fig. 8 I have illustrated somewhat diagrammatically the application of my invention to a conveyer in which the material is moved up an incline. Such a possibility has many places of application as in the mine tunnel 37 illustrated. In this installation the trough 7 is supported throughout the greater portion of its length by means of hangers 38, there being only one spring support 8 at the left hand end. This brings out the fact that my invention can be used with various types of support, particularly where the driving mechanism imparts positive movement to the conveyer in both directions.

Furthermore, Fig. 8 brings out the fact that the driving mechanism 38 can be connected to the conveyer 7 at some point other than at an end. In the present instance the connection is made at the point 39 where the horizontal section of the conveyer joins the upwardly inclined section. The coal 40 is being conveyed from the pile at the right to the mine car 41 at the left.

Figs. 9 and 10 illustrate an application of my invention to a closed conveyer, which is particularly suitable for pulverized material such as pulverized coal or cement. The material to be conveyed is dumped from the bin 42 into the conveyer pipe 43 which is mounted upon spring supports 8a in the manner of Figs. 1 to 4 inclusive. The driving mechanism is the same as the driving mechanism in Fig. 1. The material is discharged downwardly through the outlet pipe 44.

I wish it to be understood that various types of driving mechanism can be employed and while I favor those which have been illustrated, they should be considered as merely illustrative. However, at the present time, I prefer the quick return motion of Figs. 5 to 7.

What I claim is:—

1. A drive mechanism for a reciprocating conveyer comprising, in combination, a crank pin, a rod pivoted thereon and reciprocated thereby, a pivoted guide for said rod, a pin eccentric to the pivot for said guide, and a connection between said last mentioned pin and the conveyer.

2. A drive mechanism for a reciprocating conveyer comprising, in combination, a crank pin, a rod pivoted thereon and reciprocated thereby, a guide for the rod pivoted outside the circle described by the crank, a pin eccentric to the pivot for said guide, and a connection between said last mentioned pin and the conveyer.

3. A reciprocating conveyer comprising in combination, a conveyer element, yielding supporting means therefor, and means for longitudinally reciprocating said conveyer with a stroke so short that the arc of travel of the points of support will not sensibly displace the conveyer element or its contents above or below its normal plane, said stroke, in one direction, being substantially maximum at start and of sufficient speed to slide the conveyer beneath the material and, in the other direction, being substantially minimum at start and sufficiently slow to carry the material with the conveyer, and the time for the stroke in the conveying direction being materially greater than in the return direction.

4. A reciprocating conveyer comprising in combination, a conveyer element, yielding supporting means therefor, and means for longitudinally reciprocating said conveyer with a stroke which, in one direction, is substantially maximum at start and of sufficient speed to slide the conveyer beneath the material and, in the other direction, is substantially minimum at start and sufficiently slow to carry the material with the conveyer, the length of the stroke of said conveyer being not greater than approximately one quarter of an inch and the speed of vibration being upwards of approximately 600 strokes per minute, and the time for the stroke in the conveying direction being materially greater than in the return direction.

EDWARD F. TAFEL.